United States Patent
Scott

[11] 3,821,763
[45] June 28, 1974

[54] ANNULAR FIELD OPTICAL IMAGING SYSTEM
[75] Inventor: Roderic M. Scott, Stamford, Conn.
[73] Assignee: The Perkin-Elmer Corporation, Norwalk, Conn.
[22] Filed: Nov. 27, 1972
[21] Appl. No.: 309,642

Related U.S. Application Data
[63] Continuation-in-part of Ser. No. 154,985, June 21, 1971, abandoned.

[52] U.S. Cl................ 354/94, 95/12.5, 350/206
[51] Int. Cl. ........................................ G03b 37/00
[58] Field of Search ............... 95/125, 15; 350/206

[56] References Cited
UNITED STATES PATENTS
3,221,625  12/1965  Leighton............................ 95/12.5
3,240,139  3/1966   Madden.............................. 95/12.5

*Primary Examiner*—Richard M. Sheer
*Attorney, Agent, or Firm*—John K. Conant

[57] ABSTRACT

Image-forming optical systems (dioptric, catoptric or catadioptric) include rotationally symmetric image-forming elements, and apparatus selecting from the image of an extended object field formed thereby a portion having adequate image quality lying in a segment of an annular zone centered on the optical axis of those elements. Relative motion of the object field and image-forming elements permits recording the image of the entire object field.

8 Claims, 14 Drawing Figures

ANNULAR FIELD OPTICAL IMAGING SYSTEM

This application is a continuation-in-part of my application Ser. No. 154,985 filed June 21, 1971, now abandoned.

The present invention relates to scanning optical systems which may be dioptric, catoptric or catadioptric. In particular, the invention provides an image-forming optical system including rotationally symmetric, coaxially ordered image-forming elements in fixed relation to a slit or slits (or other image-perception limiting means) which define at or near a conjugate focal plane of the system a segment of an annular zone about the system axis to which segment perception of the image formed by the system, e.g., by recording, is restricted by the slit. The image-forming elements and slit or slits may be moved with respect to an extended object field to scan the latter and thus to form, with time, an image of that object field at the selected segment where it may be recorded on an image-receiving surface. In certain presently preferred embodiments, the image-receiving surface is given with respect to the image-forming elements a motion suitably coordinated to the motion of those elements with respect to the object field. In certain other embodiments, the image-receiving surface is stationary but can be periodically erased to receive new information, so that the image information is read out sequentially from the same image-receiving elements.

In order to form simultaneously an image at uniform quality of all parts of a large object field, a complicated and expensive lens or other image-forming system is required, since the system must provide the same correction at all parts of that field. The resulting demands on the system are especially severe, if that uniform quality is to be a high quality.

A conventional method for extending the field for which an optical system can be used is to employ it in a scanning mode. In this way a rectangular or strip-shaped field whose long dimension may be very large, indeed large without limit, can be covered by an optical system which gives adequate imaging over a field whose long dimension corresponds to the small dimension of the strip-shaped field. To accomplish this, there has been used with a lens scanned over the strip-shaped field a straight rectangular slit whose long dimension limits the portion of the image which is instantaneously recorded to the small dimension of the strip-shaped field to be scanned. U.S. Pat. No. 2,433,534 discloses a scanning optical system of this kind. The lens required in such a scanning system to provide an image extending over the small dimension of the strip-shaped field to be scanned can be less complicated and/or it can provide better imaging than a lens sufficient to form at one time an image of the entire rectangular or strip-shaped field. However in the design of such a lens compromises must be made to make the imaging adequate over the range of field angles to which the rectangular slit extends. In view of these compromises, the imagery at a typical region in the part of the field selected by the slit is not the optimum which might be achieved in a system corrected for that region of the field alone, and moreover the quality of the image will vary over the part of the field selected by the slit.

A principal object of the invention is the provision of a system for forming images of uniform quality of an extended object area. According to the invention there is combined with the image-forming elements, whether lenses, mirrors or a combination thereof, a slit coinciding substantially with an arcuate segment of a zone or annulus disposed about the system axis. The portion of the image recorded through the area defined by the slit will be of uniform quality along the length of the arcuate segment, since all points of it are at substantially the same distance from the axis of symmetry. Moreover, stereoscopic imagery may be achieved simply by placing two such slits to expose different segments of the annular zone.

In accordance with the present invention an annular zone of adequate quality imagery, hereinafter termed "stigmatic" imagery, is formed with an optical system in which the optical elements are arranged in cooperative relationship in a rotationally symmetric system which is corrected to produce stigmatic imagery at one off-axis point. By correcting a rotationally symmetric system to produce stigmatic imagery at one off-axis point, a ring of such points is provided around the axis of symmetry, and a zone of adequate image quality if provided along this ring and extending some small distance radially inward and outward therefrom.

BRIEF DESCRIPTION OF THE DRAWINGS

The invention will now be further described in terms of a number of presently preferred exemplary embodiments thereof and with reference to the accompanying drawings in which:

FIG. 13 is a diagrammatic representation of still another embodiment of the invention; and FIG. 14 is a diagrammatic view of part of the apparatus of the embodiment of FIG. 13.

DESCRIPTION OF PREFERRED EMBODIMENTS

In accordance with this invention an extended object is scanned by an optical system which is constructed to provide an annular field of stigmatic imagery, spaced from and centered around the optical axis of the system. In the usual terminology the system is said to be corrected for a single off-axis point, but since the system is rotationally symmetrical, the effect of such correction is to provide an annular zone or annulus of correction whose mean radius is the distance of the corrected point from the axis. With this arrangement the imagery is equally good at all points in the annular zone, as compared with a system or element corrected to produce stigmatic imagery on its axis in which the best imagery occurs at only one point.

In optical systems used in accordance with the invention, since only one annular zone of the field is used, the scale of the imagery is constant. In these systems the quality of the imagery is thus not deteriorated by distortion as in the case in conventional scanning optical systems.

Figures 1, 2:
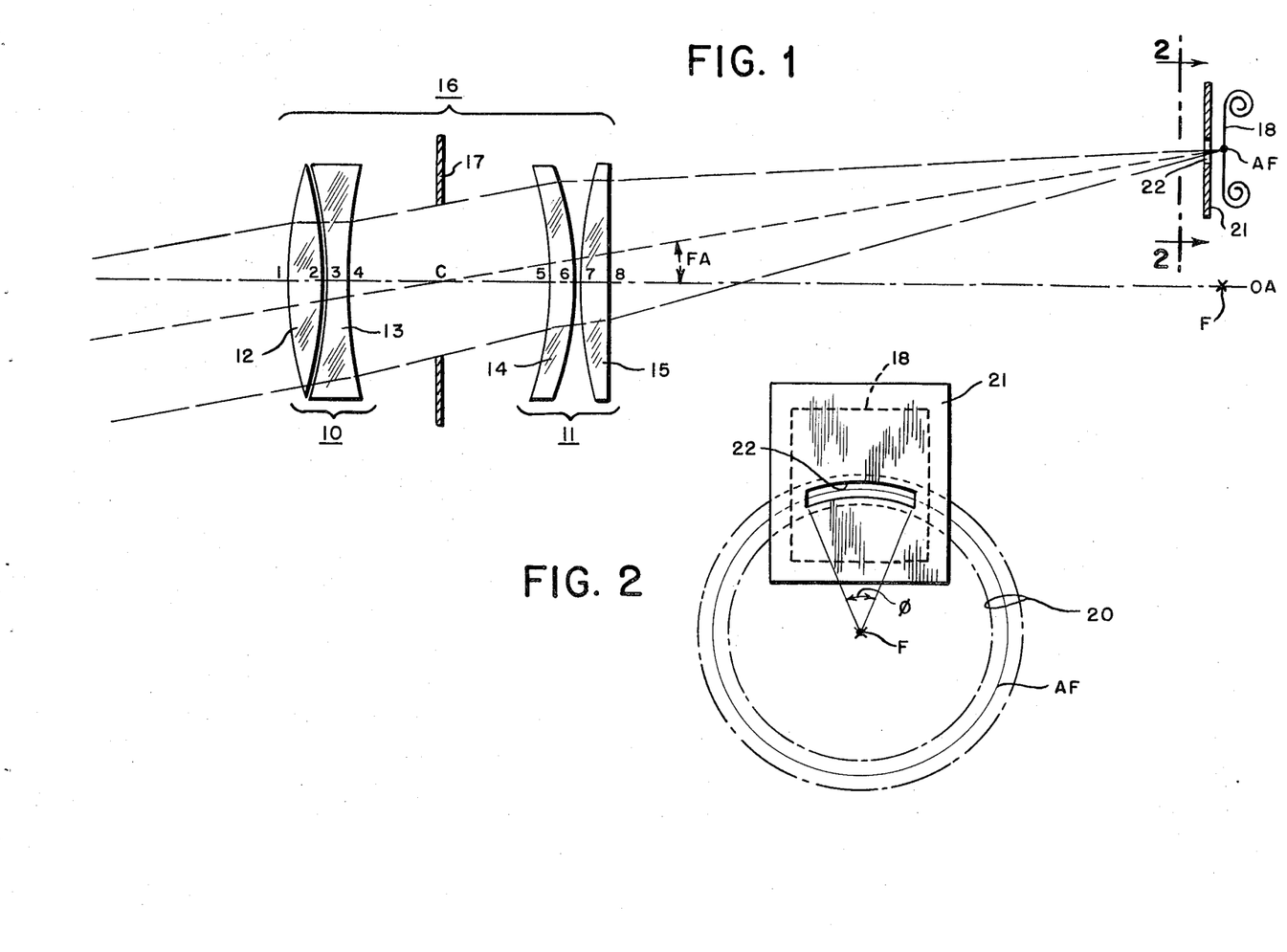
FIG. 1 is a schematic illustration of a simple optical system embodying the present invention.
FIG. 2 is an elevational view of the slit and image-receiving surface of the embodiment of FIG. 1, taken in the direction indicated by the line 2—2 in FIG. 1.

An embodiment of the invention, providing an annular zone of stigmatic imagery is illustrated schematically in FIG. 1. It comprises two groups 10 and 11 of lenses or lens elements together forming a lens 16 having an optical center C between the groups 10 and 11. The elements of the two groups are rotationally symmetric about a common optical axis OA. Group 10 consists of a double-convex element 12 air-spaced from a double concave element 13. Group 11 consists of a concave-convex element 14 air-spaced from a double-convex element 15. The system of FIG. 1 further comprises a diaphragm 17 between the lens groups 10 and 11, a mask 21 having a slit 22 therein positioned adjacent a conjugate focal plane of the lens 16 for the object field being imaged, and an image-receiving surface such as a film 18 disposed behind the slit in a focal plane of the lens 16 for the object field of interest. These elements of the system are fixed with respect to each other, except that the film 18 may be advanced in its own plane relative to the mask as the system is moved with respect to the object field. The slit 22 is of arcuate form (FIG. 2), conforming substantially to a segment of a zone concentric with the axis OA and in a plane perpendicular to that axis. The term zone is here used to mean the area between two concentric circles in the same plane.

In FIG. 1 the system is illustrated as employed to image a distant object field, i.e., at infinity, on the left. The lens therefore forms an image of this object field at its rear or second principal focal plane or surface, whose intersection with the system axis is indicated at F. Behind the mask 21 there is disposed an image-receiving surface, which may take the form of a photographic film 18. Mechanism may be provided to advance the film past the slit at a rate coordinated to the motion of the system as a whole, i.e., of lens 16, diaphragm 17, mask 21 and the film 18, with respect to the field being explored, in a manner known in the art, for example, of aerial photographic surveying. The slit 22 is of such curvature and radial extent, and is so spaced from the axis OA as to lie adjacent to a part of an annular zone 20 (FIG. 2) of the second principal focal plane of the lens 16 in which the lens will focus bundles of collimated light arriving from infinity on the left and having a selected range of values for the angle of inclination FA of those bundles to the system axis. This range is selected according to the range of acceptable values of image quality, as will be explained in connection with FIG. 3.

As shown in FIG. 2 the annular field AF of points corrected to produce stigmatic imagery is a circle centered around the system axis OA; the zone of adequate quality imagery is an annular zone 20 including the annular field defined by line AF and extending to either side. The inner and outer radial boundaries of the zone 20 are the distances at either side of the annular field line AF at which image quality is still adequate or "stigmatic," i.e., within acceptable limits for the purpose in view. The mask or plate 21 mounted adjacent and parallel to a portion of the zone 20 has a slit 22 through it exposing a segment of the zone. The slit may be any suitable configuration but for achieving the largest possible exposure of good imagery it is suitably an arcuate segment conforming to the curvature and width of the underlying segment of the zone 20 as shown.

Annular field systems in accordance with this invention can be utilized in systems working at infinity or at finite conjugates. In the latter case the mask having a slit therein may be placed near the object or near the image, or one may be disposed at each place.

A particular advantage of an annular zone of adequate imagery for scanning, in comparison with scanning an on-axis corrected image, is that an annular zone provides uniformly optimized imagery along the entire length of the arcuate segment selected, whereas with an image centered on the axis the conflicting requirements of correction for different parts of the field result in imagery whose quality varies over the field so centered on the axis.

In the system of the invention, the image-forming elements or means are desirably given a preferential correction at the off-axis location at which they are to be "used" by their association with the arcuate slit or other aperture limiting or defining means which forms part of the system. That is to say, the curvatures, thicknesses and spacings of the elements are selected to produce improved image performance at a selected field angle or range of field angles other than zero, even at the expense of reduced image performance at smaller field angles closer to the system axis.

Data on one lens of the form shown for the lens 16 in FIG. 1, suitable for use in the invention and having such preferential correction at an extra-axial portion of its field, are given in the accompanying table, wherein the lens surfaces are numbered 1 through 8 from left to right. As designed for an effective focal length of 914.4 mm., or 36 inches, the lens has the following parameters (all linear dimensions being given in millimeters):

| Surface | Clear Aperture | Radius of Curvature | Thickness | Spacing |
|---|---|---|---|---|
| 1 | 238 | 444.97* | | |
| | | | 27.43 | |
| 2 | 236 | −980.3 | | |
| | | | | 1.83 |
| 3 | 236 | −824.7 | | |
| | | | 27.43 | |
| 4 | 218 | 637.5 | | |
| | | | | 273.62 |
| 5 | 214 | −396.9 | | |

-Continued

| Surface | Clear Aperture | Radius of Curvature | Thickness | Spacing |
|---|---|---|---|---|
|  |  |  | 27.43 |  |
| 6 | 224 | −348.3 |  |  |
|  |  |  |  | 0.95 |
| 7 | 232 | 732.0 |  |  |
|  |  |  | 27.43 |  |
| 8 | 233 | −17341.2** |  |  |

*This surface is aspheric. At the radial distance $r$ in millimeters from the center of the lens element 12 the departure of the aspheric surface from the base sphere is $4.714 \times 10^{-10} r^4$ in the up-edge sense.

**This surface is aspheric. At the distance $r$ from the center of the lens element 15 the departure of the aspheric surface from the base sphere is $1.2954 \times 10^{-9} r^4$ in the up-edge sense.

As in the usual convention, a negative radius in the table indicates curvature about a point to the left of the surface; otherwise the center of the surface is to the right. The index of refraction of each of the lens elements 12, 13, 14 and 15 of the lens of the table is the same, namely 1.5. The distance from the right-hand vertex of element 15 to the focus at F is 791.65 mm. The barrel length of the system of the table is about 0.4 times its focal length and the distance from its front vertex to its rear focus is about 1.3 times its focal length.

Figure 3:
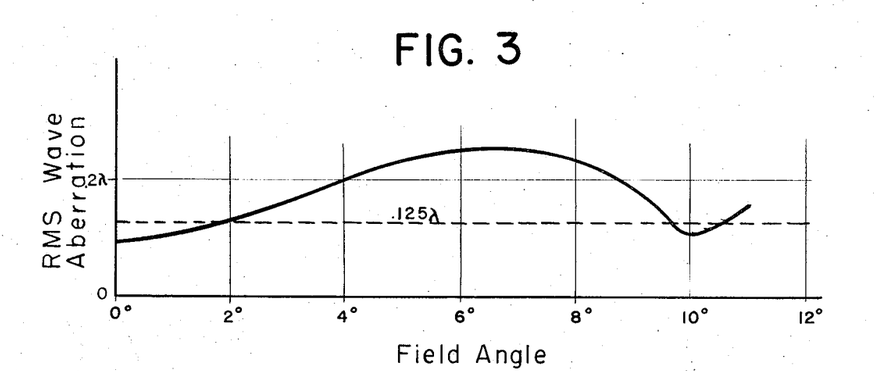
FIG. 3 is a graph of the variation in imagery with field angle for a particular lens which can be used in the system of FIGS. 1 and 2.

FIG. 3 shows, for the lens of the foregoing table, the variation in image quality with field angle. More particularly, the root-mean-square departure of the wavefront from the closest sphere is plotted in FIG. 3 as a function of field angle. The unit of wavefront deformation, i.e., the unit in which such departure is plotted, is the wavelength $\lambda$ and the data was taken for a wavelentth of 6,000A units. It will be seen that thedeformation rises from about $0.09\lambda$ at a field angle of zero t a value of $0.125\lambda$ at a field angle of 1.8°. The deformation then continues to increase with field angle to a maximum at a field angle of approximately 7° and then declines below $0.125\lambda$ at a field angle of 10° and then rises again.

Figure 4:
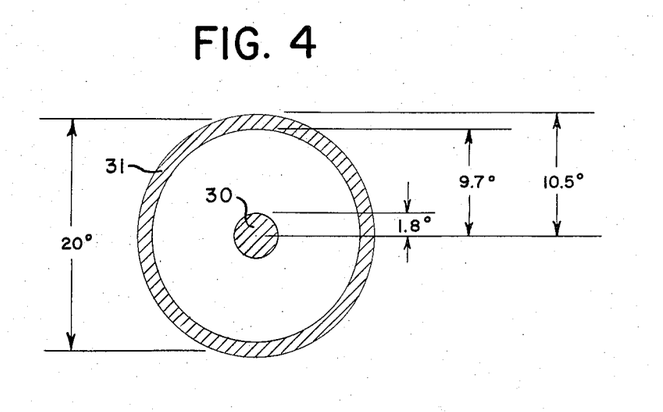
FIG. 4 is a diagram useful in explaining FIG. 3.

The preferential zonal correction of the lens 16 of the table is additionally portrayed in FIG. 4. In FIG. 4 a central circular area 30 represents the range of field angles from 0° to 1.8° in FIG. 3 within which that lens has an RMS (root-mean-square) wave aberration below $0.125\lambda$. An outer zone 31 represents the range of field angles between 9.7° and 10.5° within which that lens also has an RMS wave aberration below $0.125\lambda$. Alternatively, FIG. 4 may be considered to represent the areas in the focal plane of the lens, i.e., the plane in which the lens focuses images of the object field of interest. The areas 30 and 31 then represent areas in the focal plane within which the wave aberration has an RMS value below $0.125\lambda$. The area 31 thus represents the one of preferential correction of which a part or parts are selected in accordance with the invention by a slit or slits, so as to restrict the image used by the system of FIG. 1 to that portion of the object field imaged through the slit or slits. The system of FIG. 1, when equipped with a lens 16 according to the table, thus produces imagery with an RMS wave aberration below $0.125\lambda$ for $\lambda = 6,000$A units in an annular field of field angles between 9.7° and 10.5°. A part of this annular field (or of an annular field of other or greater radial extent, i.e., covering another or greater range of field angles) is selected in accordance with the invention by means of the mask 21 to permit scanning and recording of a larger field than can be instantaneously imaged through the slit in the mask. A slit of semicircular or nearly semi-circular extent provides through scanning the equivalent of a lens having this degree of correction for field angles from zero out to about 10°, or a total of 20°.

Figure 5:
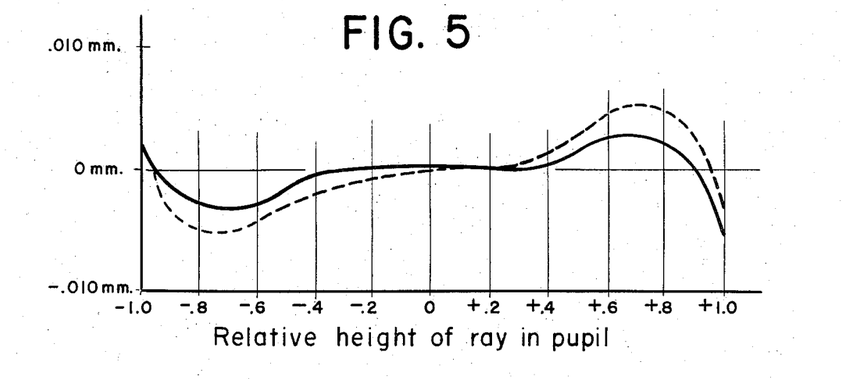
FIG. 5 is a graph of the ray aberrations of the lens above referred to in connection with FIG. 3, for tangential and sagittal fans incident from a distant object at a field angle of 10°.

Thequality of the image produced by the lens 16 of the table at the preferred field angle of 10°, is shown by FIG. 5. FIG. 5 shows, for rays for a distant object and having various relative heights in the entrance pupil of that lens, the departure of te intersection of such rays with the Gaussian image plane from the intersection with that plane of a chief ray through the center of that pupil. The full line curve is for rays of a meridional fan, i.e., in the plane of the figure, and the dash line curve is for rays in a sagittal fan perpendicular to the plane of the figure. As indicated by FIG. 5, a slight change in the astigmatism would result in a wavefront similar to that characteristic of about one-eighth wave of zonal spherical aberration. Thus this system is monochromatically diffraction-limited at $f/5$ over an effective total field of up to 20°.

Figure 6:
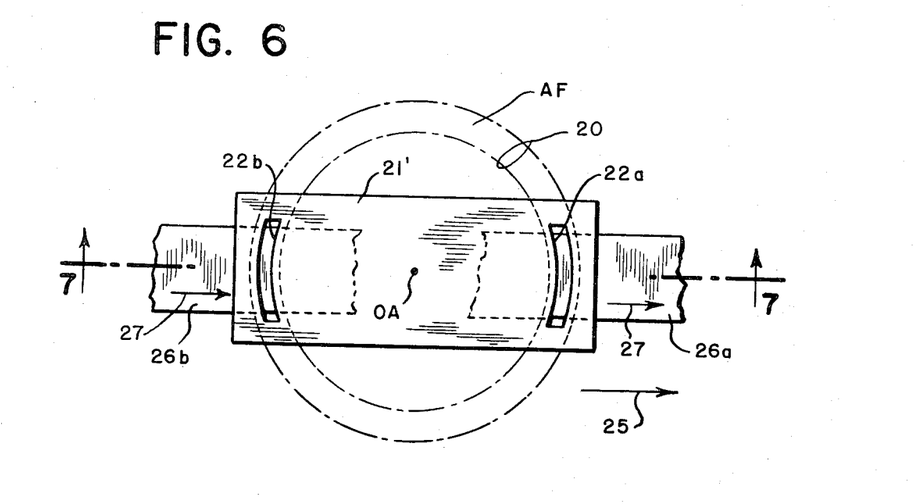
FIGS. 6 and 7 are diagrammatic views of another embodiment of the invention by means of which stereoscopically related images of a scanned field may be recorded, FIG. 6 being an elevational view taken on the line 6—6 of FIG. 7 and FIG. 7 being a sectional view taken on the line 7—7 of FIG. 6, and additionally showing schematically the image-forming elements of the system.
Figure 7:
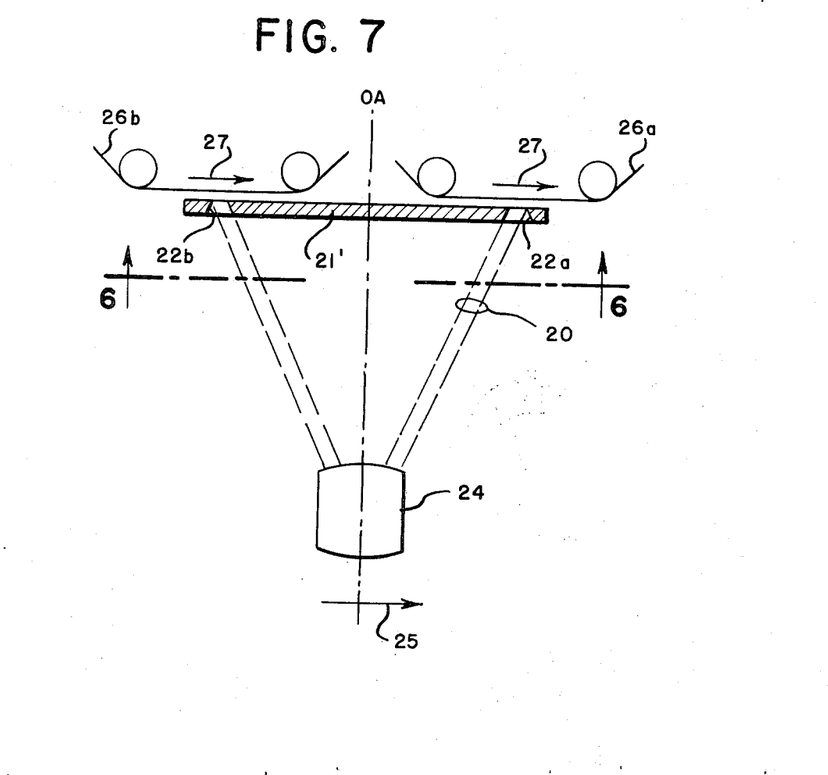

FIGS. 6 and 7 illustrate the manner in which an annular zone 20 of adequate imagery formed by a lens system 24 in accordance with this invention is used in a scanning mode for producing stereoscopic imagery as in a simple stereo strip camera. In this instance two slits, 22a and 22b, through an appropriate plate or plates, illustrated by a single plate 21', are over diametrically opposed segments of the annular zone 20. The lens system 24 together with the plate 21' move in the direction of arrow 25 over a field to be imaged sequentially. For recording the portions of the field imaged by the slits 22a and 22b, strips of photograph film 26a and 26b from separate supply reels are moved respectively over the slits in the direction of arrows 27 to separate take-up reels for recording the images of the field exposed through the slits.

The slits 22a and 22b may also be placedat other positions with respect to each other, depending on the effects to be achieved, and more than two slits may be utilized.

Figure 8:
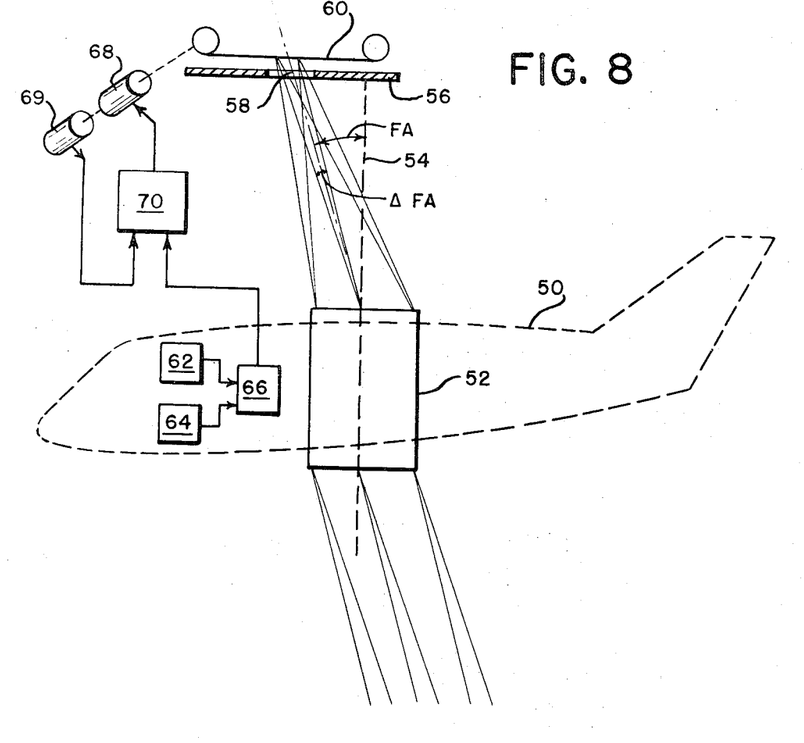
FIG. 8 is a diagrammatic representation of an embodiment of the invention as employed for aerial mapping.
Figure 9:
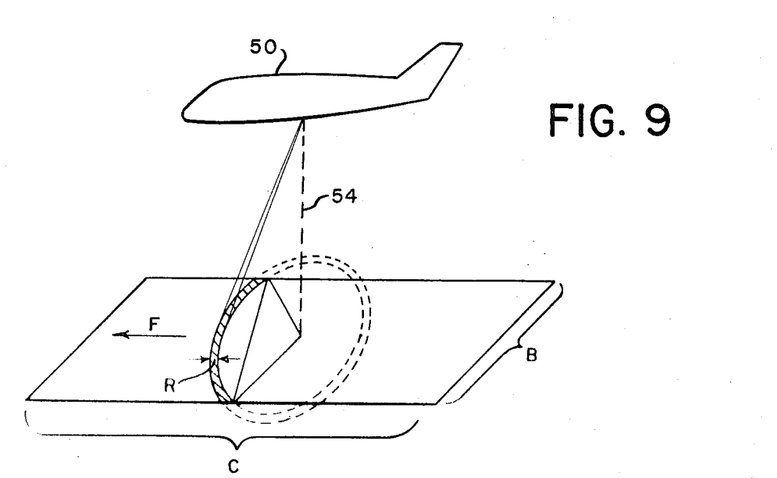
FIG. 9 is a diagram useful in explaining the operation of the embodiment of FIG. 8.

Turning now to FIGS. 8 and 9, these figures further illustrate the use of embodiments of the invention of the type shown in FIGS. 1 and 2.

The quality apparatus shown in FIG. 8, which may include that shown in FIG. 1, is supported in an aircraft, shown in phantom lines at 50. The apparatus comprises a dioptric, catoptric or catadioptric image-forming device of rotational symmetry diagrammatically indicated at 52 and having an optical axis 54. It further comprises the mask 56 having a slit 58 therein, and a movable image-receiving surface 60 which may be a photographic film for example, as in FIG. 1. This film is disposed behind the mask 56 in a plane at which the device 52 focuses images of distant objects. The mask 56 preferably has a shape similar to that of the mask 21 of FIG. 2 with a curved slit 58 of limited radial and angular extent as shown at 22 in FIG. 1, the slit 58 being displaced from but substantially centered on the optical axis 54 in FIG. 8, just as the slit 22 is centered on the axis OA in FIGS. 1 and 2. Indeed, the elements of structure 52, 56 and 60 in the embodiment of FIG. 8 may be similar to or the same as the elements 16, 21 and 18 of FIG. 1 and may be positioned with respect to each other and to the axis 54 in a manner similar to or the same as the manner in which the elements 16, 21 and 18 are positioned with respect to each other and to the axis OA of FIG. 1.

The slit 58 is so mounted with respect to the aircraft and with respect to any other mirrors, relay lenses and other related optical elements which may be employed, that the length of the image of the slit formed outside the aircraft by the imageforming device 52 in cooperation with those related optical elements is transverse of the longitudinal axis of the aircraft. This is illustrated in FIG. 9, where that image is indicated by the shaded arcuate area on a ground plane representative of a portion of the surface of the earth. The chord B of that arcuate area is seen to be transverse of the direction of flight, indicated by the arrow F, and hence transverse of the longitudinal axis of the aircraft.

The aircraft 50 carries a device 62 for sensing its air speed, a device 64 for sensing its altitude, and a ratio measuring device 66 which develops a signal representative of the ratio of air speed to altitude. The device 62 may include provision for introduction of a correction representative of wind velocity, so that the output signal from that device may represent speed of the aircraft over the ground. A motor 68 is coupled to the film 60 so as to advance it past the slit 58. The motor 68 is energized through a difference measuring device 70 which compares the actual film speed, measured at a tachometer 69, to the signal representative of prescribed film speed coming from the device 66. The prescribed film speed is in substance the speed of the aircraft over the ground multiplied into the ratio of image distance to object distance for the image-forming device 52. This ratio is the ratio of the optical distance between the film 60 and the image-forming device 52 to the altitude of the aircraft, or more exactly to the distance from the aircraft to that area on the ground whose image in the image-forming device 52 passes through the slit to reach the film, as will be explained in connection with FIG. 9.

The image-forming device 52, moreover, desirably possesses a preferential correction of one or more aberrations over the range of field angles at which light passing through that device is enabled additionally to pass through the slit 58. If, as in the embodiment of FIG. 1, the field angle at the radial midpoint of the slit 58 is FA, and if the radial angular extent of that slit is $\Delta FA$, then the range of field angles of interest extends substantially from $FA - \frac{1}{2} \Delta FA$ at the radially inner edge of the slit to $FA + \frac{1}{2} \Delta FA$ at the radially outer edge of the slit.

Upon motion of the aircraft over the ground, there will be recorded on the film or other image-receiving surface 60 a continuous strip record of the terrain with the image quality appertaining in the image-forming device 52 to the field angle FA and to adjacent field angles extending to the limits $FA \pm \frac{1}{2} \Delta FA$ accommodated by the slit.

The manner in which the apparatus of FIG. 8 makes such a record is illustrated in FIG. 9. The aircraft 50 permits exposure of the film at any instant of time to the image of an arcuate area on the ground whose chord B may be hundreds or thousands of feet wide. Thus in a short time, with the aircraft flying a distance C, there may be recorded an image of an area BC of many square miles. The radial extent R of this arcuate area is, substantially, and assuming the aircraft to fly with the axis 54 vertical and at an altitude H, $H [\tan (FA + \Delta FA/2) - \tan (FA - \Delta FA2)]$.

The chord B of this arcuate area and hence the width of the swath so recorded is readily calculated from the angular extent of the slit 58. If this angle is $\phi$, as indicated in FIG. 2, and if again the aircraft flies with the optical axis 54 vertical, the width B is approximately $$2H \tan FA \sin \phi/2.$$

Moreover, as hereinabove set forth, the entire recorded image partakes of the uniform image quality which the image-forming means 52 possess at the field angles extending from $$FA + \Delta FA/2 \text{ to } FA - \Delta FA/2.$$

Figures 10, 11:
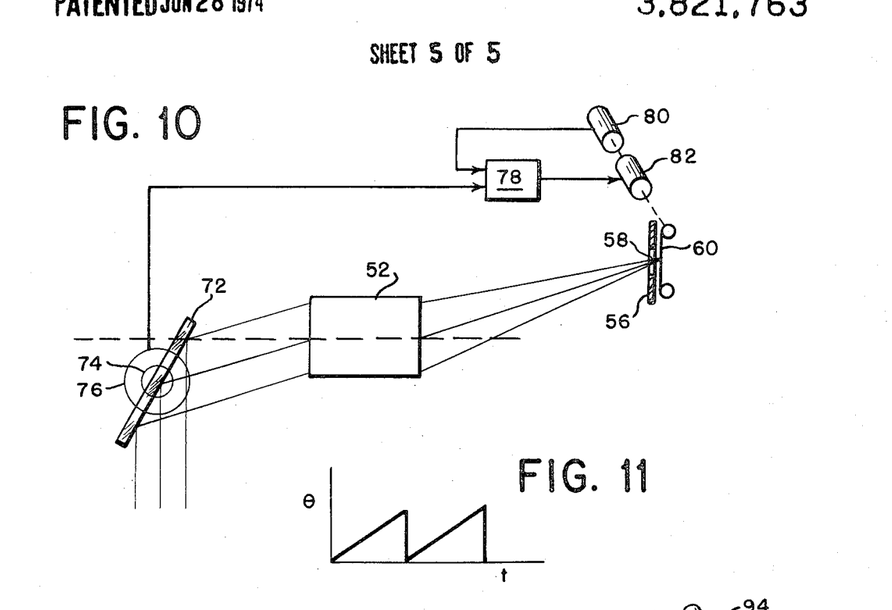
FIG. 10 is a diagrammatic representation of another embodiment of the invention which may be employed, like that of FIG. 8, to record images of extended distant objects.
FIG. 11 is a diagram useful in explaining the operation of the embodiment of FIG. 10; wavelength the deformation to FIG. 12 is a diagrammatic representation of another embodiment of the invention, useful for recording images of extended near objects.

Turning now to the embodiment of FIG. 10, this embodiment includes an image-forming system 52 which may be the same as or similar to that of the embodiment of FIGS. 1 and 2. Indeed, the embodiment of FIG. 10 includes elements of structure 52, 56 and 60 which may be similar to or the same as, and which are arranged in a manner similar to or the same as that of the correspondingly numbered elements of structure in FIG. 8. Instead however of being translated with respect to an object field, the embodiment of FIG. 10 includes a mirror 72 by means of which the object field is scanned. This mirror is pivoted on the object side of the imaging means 52 and is coupled to a drive motor 74. The motor rotates the mirror through an angle $\theta$, for example in a manner varying with time as illustrated in FIG. 11. An angle sensor 76 coupled to the mirror supplies to a comparison device 78 a signal representative of angular position of that mirror. The comparison device receives from another sensor 80 a signal representative of film position and the film drive motor 82 advances the film in response to the output of the comparison device 78, so that film motion is properly coordinated with the scanning of the object field. In a modification of the embodiment of FIG. 10 the assembly comprising elements of structure 52, 56 and 60, in fixed relative position with respect to each other except for the motion of the film in its own plane past the slit in mask 56, can be rotated with respect to the object field by means of a motor similar to the motor 74. An angle sensor similar to the sensor 76 will in such an embodiment supply a signal representative of the angular position of the image-forming means 52 itself, and this signal may be supplied to a comparison device 78 connected to a sensor 80 and film drive motor 82, as in the embodiment illustrated in FIG. 10.

Of course the invention is not limited to the use of lenses (or of catoptric or catadioptric image-forming means) working at infinity conjugates.

Figures 12, 13, 14:
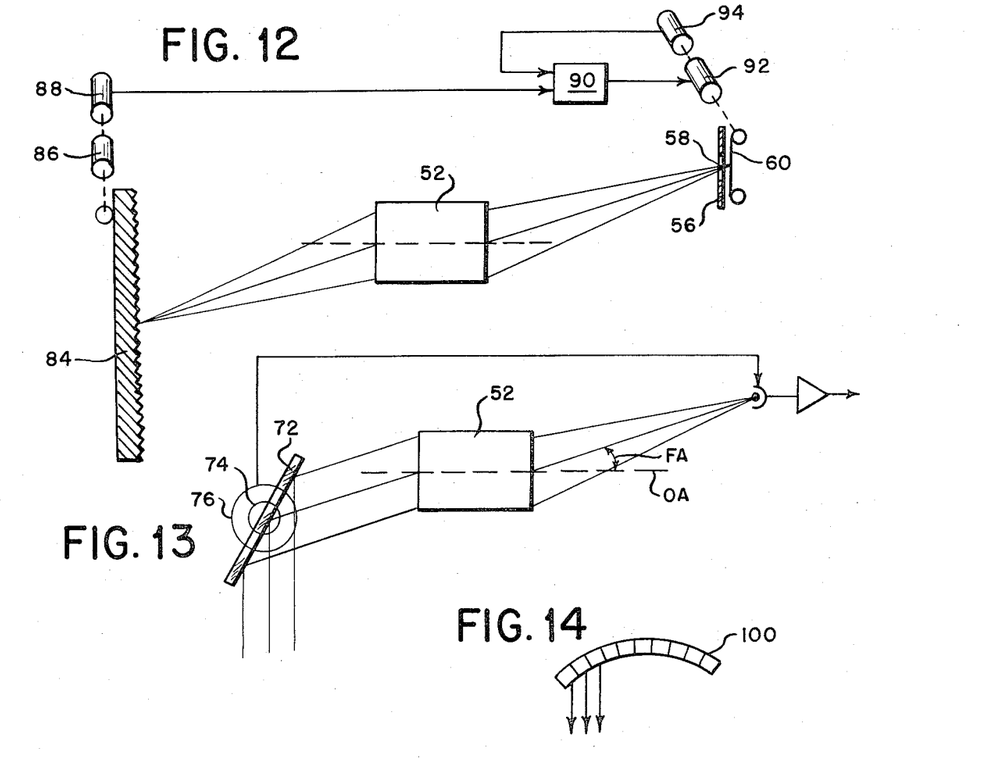

FIG. 12 illustrates an embodiment of the invention for recording an image of an extended object 84 which is however near to the image-forming means 52. The embodiment of FIG. 12 includes elements of structure 52, 56 and 60 which may be similar to or the same as, and which may be arranged in a manner similar to or the same as that of the correspondingly numbered elements of structure in FIG. 8, with the exception that in FIG. 12 the film 60 is in a plane whose conjugate in the image-forming device 52 is the surface of the object 84 rather than a distant plane, as in FIGS. 8, 9 and 10. In FIG. 12 the object 84 is moved past the image-forming means 52 by a drive motor 86. The position of the object is reported by a sensor 88 to a comparison device 90. Device 90 controls energization of a film drive motor 92 in accordance with a comparison of the object position against film position, the latter being reported by a position sensor 94.

FIGS. 13 and 14 illustrate still another embodiment of the invention. In this embodiment, which may otherwise be similar to those of FIGS. 8, 10 or 12, the mask 56 and film 60 are replaced by an arcuate array 100 of sensing elements such as photocells. The photocells are disposed in an arcuate array centered on the optical axis OA, and are in fixed position with respect to the image-forming device 52 so as to lie along an arc of selected field angle FA. The photocells are scanned successively in a cyclical pattern by means of apparatus which may be conventional. The result is a set of time sequential signals which can be recorded and which with suitable relative motion of the imaging means and the object field record the nature of an extended object field with the accuracy characteristic of the image-forming device 52 as corrected at the field angle AF at which the elements of the array 100 are located.

The invention thus provides apparatus for forming an image of an extended object comprising imaging means such as those shown at 52 in FIG. 8 or at 16 in FIG. 1, aperture limiting means such as the mask 56 of FIG. 8 or 21 of FIG. 1 which define at a conjugate focal surface of those imaging means an area which possesses at the imaging means field angles other than zero, and means such as the mirror 72 of FIG. 10 or drive motor 86 of FIG. 12 to scan the extended object, i.e., to scan the object field of those imaging means through a field extending beyond that object field.

The invention thus also provides apparatus for recording an image of an extended object comprising imaging means such as those shown at 52 in FIG. 8 or at 16 in FIG. 1, aperture limiting means such as the mask 56 of FIG. 8 or 21 of FIG. 1 which define at a conjugate focal surface of those imaging means an area which possesses at the imaging means field angles other than zero, and means such as the film 60 and drive motor 68 therefor of FIG. 8 to record through time the image formed by the imaging means in that area.

The invention also provides image-forming apparatus comprising imaging means such as the lens 16 of FIG. 1, image-receiving means such as the film 18, image-limiting or aperture defining means such as the mask 21, and object scanning means such as the mirror 72 of FIG. 10 or motor 86 of FIG. 12. The imaging means include a plurality of image-forming elements such as the lens elements 12, 13, 14 and 15, all having at least one image-forming surface conforming substantially to at least a part of a surface of revolution about a common axis. Thus the lens elements 12 to 15 of FIG. 1 are bounded by surfaces which belong to surfaces of revolution about the system axis OA, although of course those surfaces need not be complete. Thus for example, the lower portions of the lens elements 14 and 15 may be cut away or removed, if that should be useful or necessary to accommodate other elements of apparatus with which the embodiment of the invention shown in FIGS. 1 and 2 might be associated. The image-receiving film 18 defines an image-receiving surface, namely its own, at a finite distance from the image-forming elements where those elements are capable of forming a focused image of objects. The location of the film 18 with respect to the lens 16 of FIG. 1 will of course depend on whether it is desired to form, and to record, images of objects at infinity or of objects at a finite distance from the system. The image-receiving film 18 is moreover disposed exteriorly of the axis of symmetry OA in which the image-forming elements are rotationally symmetric as above explained, and the image-limiting mask 21 limits the instantaneously recorded portion of the image formed by the imaging means 16 of FIG. 1 on the surface of the film 18 to the portion focused on an area of that surface conforming substantially to at least a segment of an annulus disposed about that axis of symmetry. This segment is illustrated by the slit 22 as seen in FIG. 2.

The invention also provides a method of recording an image of an extended object which comprises the step of scanning an object past an image-forming means of rotational symmetry, as by use of the aircraft shown in FIGS. 8 and 9 of the drawings, or by use of the mirror 72 of FIGS. 10 and 13, and the step of recording through time that portion of the image of that object produced from time-to-time by those image-forming means within a range of field angles not including zero, as by means of the moving film 60 of FIG. 8 or the repetitively scanned photocells 106 of FIG. 4.

While the invention has been described hereinabove in terms of a number of presently preferred embodiments, the invention is not limited thereto, but rather includes all modifications of and departures from those embodiments properly falling within the spirit and scope of the appended claims.

I claim:

1. Image-forming apparatus comprising image-forming optical elements arranged in an imaging system that is rotationally symmetric about an axis, said system being optically corrected to produce stigmatic imagery in an annular zone centered on said axis with all points in said zone possessing filed angles other than zero, at least one imaging surface conforming substantially to at least part of said zone, aperture limiting means defining at a conjugate focal surface of said system an area whose points possess field angles corresponding to the field angles of points in said zone, said aperture limiting means being positioned to define an object field area imaged on said imaging surface, and means to scan said object field area with respect to said system.

2. Apparatus for recording an image of an extended object comprising image-forming optical elements arranged in an imaging system that is rotationally symmetric about an axis, said system being optically corrected to produce stigmatic imagery in an annular zone centered on said axis with all points in said zone possessing field angles other than zero, at least one imaging surface conforming substantially to at least part of said zone, aperture limiting means defining at a conjugate focal surface of said system an area whose points possess field angles corresponding to the field angles of points in said zone, said aperture limiting means being positioned to define an object field area imaged on said imaging surface, and means to record through time the image formed in said object field area.

3. Apparatus according to claim 2 wherein said aperture-limiting means define a slit transparent to light and conforming substantially to a segment of said annular zone.

4. Apparatus according to claim 2 wherein said imaging system possesses better imaging properties for a range of field angles embraced by said annular zone than for a range of smaller field angles.

5. Apparatus according to claim 4 in which said imaging surface and said image recording means are provided by an image-recording surface advancing through a part of said annular zone.

6. An image-forming system for use in a scanning mode, said system comprising at least two separate optical elements combined in coaxial relation to possess symmetry in an axis, means defining an image surface at a finite distance from said elements, and means limiting the light passing through said elements and reaching said surface to an area of said surface conforming substantially to at least a segment of an annulus centered on said axis, said elements being optically corrected to produce stigmatic imagery in an annular zone centered on said axis with all points in said zone possessing field angles other than zero and in relation to each other for the system to produce corrected stigmatic imagery in said annulus.

7. The method of recording an image of an extended object which comprises the steps of
   a. providing an image-forming system that is rotationally symmetric about an axis and optically corrected to produce stigmatic imagery in an annular zone centered on said axis with all points in said zone possessing field angles other than zero,
   b. scanning an object field past said system, and
   c. recording through time that portion of the image of said object field that produced by said system at a segment of said annular zone.

8. The method of recording an image of an extended object which comprises the steps of
   a. providing an image-forming system that is rotationally symmetric about an axis and optically corrected to produce stigmatic imagery in an annular zone centered on said axis with all points in said zone possessing field angles other than zero,
   b. scanning an object field past said system,
   c. advancing an image receiving surface through a focal surface of the system at a segment of said annular zone, and
   d. limiting to said segment the light from said object field imaged by the system allowed to reach said image receiving surface.

* * * * *